United States Patent [19]
McKibbin et al.

[11] Patent Number: 5,466,198
[45] Date of Patent: Nov. 14, 1995

[54] GEARED DRIVE SYSTEM FOR A BLADED PROPULSOR

[75] Inventors: Albert H. McKibbin, Cromwell; Jon D. Burno, South Windsor, both of Conn.

[73] Assignee: United Technologies Corporation, Hartford, Conn.

[21] Appl. No.: 75,827

[22] Filed: Jun. 11, 1993

[51] Int. Cl.⁶ .................................................. F16H 1/28
[52] U.S. Cl. ................................................................. 475/346
[58] Field of Search ............................................ 475/346

[56] References Cited

U.S. PATENT DOCUMENTS

| | | | |
|---|---|---|---|
| 2,547,877 | 4/1951 | Lucia | 74/801 |
| 2,591,743 | 4/1952 | Thompson | 475/346 |
| 3,227,006 | 1/1966 | Bowen, Jr. | 475/346 |
| 3,315,547 | 4/1967 | Fritsch | 475/346 |
| 3,635,103 | 1/1972 | Monti | 475/346 |
| 4,158,967 | 6/1979 | Vatterott | 475/346 |
| 4,430,909 | 2/1984 | Magnuson | 475/346 |

FOREIGN PATENT DOCUMENTS

| | | | |
|---|---|---|---|
| 1500451 | 2/1965 | Germany | F16H 1/48 |
| 0289318 | 4/1991 | Germany | 475/346 |
| 0163848 | 9/1983 | Japan | 475/346 |
| 691775 | 5/1953 | United Kingdom . | |
| 1367343 | 9/1974 | United Kingdom | F16H 1/48 |

*Primary Examiner*—Dirk Wright
*Attorney, Agent, or Firm*—Kenneth C. Baran

[57] ABSTRACT

A geared drive system employing a planetary gear train conveys torque and rotary motion from a source thereof to a bladed propulsor or other device requiring torque and rotary motion. A pivotable joint arrangement connects the planet carrier to a rotating or static torque frame in a manner that isolates the carrier from torsional deflections and the deleterious effects thereof.

11 Claims, 6 Drawing Sheets fig. 1 fig.2 fig.3
prior art fig. 4 fig. 5 fig.6 fig.7

GEARED DRIVE SYSTEM FOR A BLADED PROPULSOR

TECHNICAL FIELD

This invention relates generally to torque transmission systems and more particularly to a geared drive system for powering a bladed propulsor.

BACKGROUND ART

Torque is often transmitted through rotating machines from a source of torque to an output device or component. One example is a bladed propulsion system for powering aircraft. In such systems, a powerplant is the source of torque and rotary motion. A drive system conveys the torque and rotary motion to propulsor blades which may be a propeller or fan of a reciprocating engine or gas turbine engine. Frequently, it is desirable or necessary for the rotational speed of the propulsor blades to be different, generally slower, than that of the power plant.

One way to drive the fan at a rotational speed slower than that of the power plant is to employ a geared drive system which includes a planetary gear train as a member of the drive system. Planetary gear trains are well known and include three gear assemblies—a sun gear assembly including a sun gear, a ring gear assembly including a ring gear, and a planet gear assembly including a planet carrier supporting a plurality of planet gears disposed mechanically intermediate of and in meshing engagement with the ring gear and the sun gear. The sun gear, ring gear and planet carrier share a common longitudinally extending central axis about which at least two of them rotate. The planet gears each have an individual axis of rotation. Typically, the sun gear, ring gear, planet carrier and planet gear axes are all parallel.

Planetary gear trains are highly versatile. In certain planetary gear trains characterized by a single input and a single output, any one of the aforementioned three gear assemblies can be connected to a rotary input. Either of the other two of the three gear assemblies can serve as an output by being connected to a load to be driven while the remaining gear assembly is held stationary relative to the other two.

A planetary gear train arrangement that accomplishes a speed reduction is one whose sun gear assembly is driven by the power plant and whose ring gear assembly is stationary. The planet gears each rotate about their individual axes while simultaneously orbiting about the sun gear. The planet gear orbital motion rotates the carrier about the common central axis. The carrier rotary motion is conveyed to the load, in this case the propulsor blades, by an output shaft or other suitable mechanical structure.

A shortcoming of drive systems that include planetary gear trains arises from the torsional deflection that the drive system will necessarily experience under load due to the elasticity of the materials from which the drive system is made. Some of the torsional deflection occurs in the planet carrier. That is, under an operational load, the carrier structure twists about its central axis so that portions of the carrier which are axially spaced from one another are circumferentially displaced relative to each other. When this occurs, the parallelism of the planet gear axes relative to the sun gear and ring gear axes is disturbed.

Such disturbance of the gear axis parallelism is undesirable. Gear tooth geometry is often predicated on parallelism between the sun gear, ring gear and planet gear axes. When the parallelism is disturbed under operational load, the tooth mesh deviates from the optimum, resulting in maldistribution of loads along the gear teeth, unequal sharing of the loads between the plurality of planet gears, accelerated gear tooth wear, increased likelihood of gear tooth breakage and increased noise.

Carrier torsional deflection can also cause wear in the bearing system that supports the planet gears in the carrier. For example, the planets may be supported in the carrier by cylindrical journals that extend through a bore at the center of each planet gear and are securely attached to the carrier. A thin, essentially cylindrical film of lubricant separates the outer periphery of each journal from the bearing surface at the bore of each planet gear. The axis of each journal and the axis of its associated planet gear must remain substantially parallel so that the lubricant film can maintain separation between the gear bore and the journal along the entire axial length of the bearing surface. When the carrier undergoes torsional deflection, each journal is correspondingly deflected along its length, and in particular, its axis becomes skewed or nonparallel relative to the central axis of the gear train. The ability of the planet gear axes to experience a like displacement, thereby remaining parallel to the journal axes, will be at least partially counteracted by the meshing of the planet gears with the ring gear and sun gear. Consequently, the axes of the journals and the axes of the associated planet gears tend to become nonparallel, compromising the lubricant film's ability to separate the journals from the bearing surfaces at the bore of each gear.

The aforementioned problems might be mitigated by designing the gear teeth to be compatible with a predicted amount of nonparallelism, but this approach is completely effective only at a single operating condition. Attempting to accommodate the shortcomings by strengthening the affected components to tolerate the added wear and stress adds weight and physical size and, therefore, is unacceptable in some applications. Furthermore, the inadequacies of conventional geared drive systems are magnified with increasing power transmission requirements.

In view of these problems and the unacceptability of conventional solutions in certain environments, a high capacity, compact, reliable, light weight geared drive system that isolates the gears from the adverse effects of carrier torsional deflection is sought.

DISCLOSURE OF INVENTION

In accordance with the present invention the shortcomings of prior art geared drive systems using planetary gear trains are significantly reduced by pivotable joints which connect the planet carrier to one end of a torque transfer structure or torque frame. The other end of the torque frame is connected to either a rotating load or to a nonrotating support structure. The joint arrangement between the planet carrier and the torque frame isolates the carrier from torsional deflections.

In an exemplary embodiment, the sun gear assembly of a planetary gear train receives torque and rotary motion from a source thereof such as the power plant of an aircraft gas turbine engine. The ring gear assembly remains stationary and the planet carrier, which is part of a planet gear assembly, is rotatably driven about a central axis by the orbital motion of a plurality of planet gears in a well known manner. A torque transfer structure or torque frame forms at least part of the mechanical path between the planet carrier and the load being driven.

The torque frame is circumferentially discontinuous at a first end thereby defining a plurality of axially extending arms. A plurality of joints, circumferentially disposed with respect to the carrier and each pivotable about a radial axis, connects at least some of the torque frame arms to the carrier. Under operational load, each joint exerts an individual reaction force on the carrier. Preferably, the joints are positioned so that the resultant reaction force associated with these individual reaction forces is axially coincident with the resultant driving force that rotates the carrier. The torque frame also has a second end near which a connection is made to a rotating component, which in the exemplary embodiment is part of a rotating structure for conveying torque and rotary motion to a fan. In an alternative arrangement, the second end of the torque frame is connected to a mechanical ground that prevents rotation of the torque frame and, therefore, of the carrier.

Rotary motion of the bladed propulsor is resisted by aerodynamic forces acting at finite distances from a central axis thereby creating a torque load which torsionally deflects the torque frame. The torsional deflection manifests itself as bending of the arms at the first end of the torque frame. The pivotability of the joints connecting the torque frame arms to the carrier prevents the bending of the arms from transmitting any torsional deflection into the carrier. Instead, the carrier experiences only essentially tangentially directed reaction forces at each joint location. By locating the joints so that their resultant reaction force is axially coincident with the resultant force that rotates the carrier, the carrier is also isolated from the twisting effect that would result if the driving force and reaction force were axially separated.

In an alternative arrangement and operational mode of the planetary gear train, the planet carrier is held stationary and the ring gear assembly is connected to a load to be driven. In this mode, as in all other alternative modes, the same pivotable joint configuration connects the carrier to the torque frame near its first end. The second end of the torque frame is connected to a nonrotating support structure suitable for precluding rotary motion of the carrier; the carrier reacts the torque being conveyed through the rotating components of the gear train rather than participating in the conveyance.

In other possible arrangements and operational modes, none of the gear assemblies is stationary. One of the assemblies is adapted to accept a rotary input while both of the remaining assemblies are rotary outputs. Use of the pivotable joint as described herein for connecting the planet carrier to the torque frame benefits these single input, dual output configurations as well.

In one embodiment, the pivotable joint is a spherical bearing allowing pivotable motion about a radial axis. In another embodiment, the joint is a radially oriented trunnion connecting the torque frame to the planet carrier. Other pivotable connections would be equally suitable.

The efficacy of the invention is independent of other details of the planetary gear train such as the type of gears and the type of bearing arrangement used to support the planet gears in the carrier.

BEST MODE FOR CARRYING OUT THE INVENTION

Figure 1:
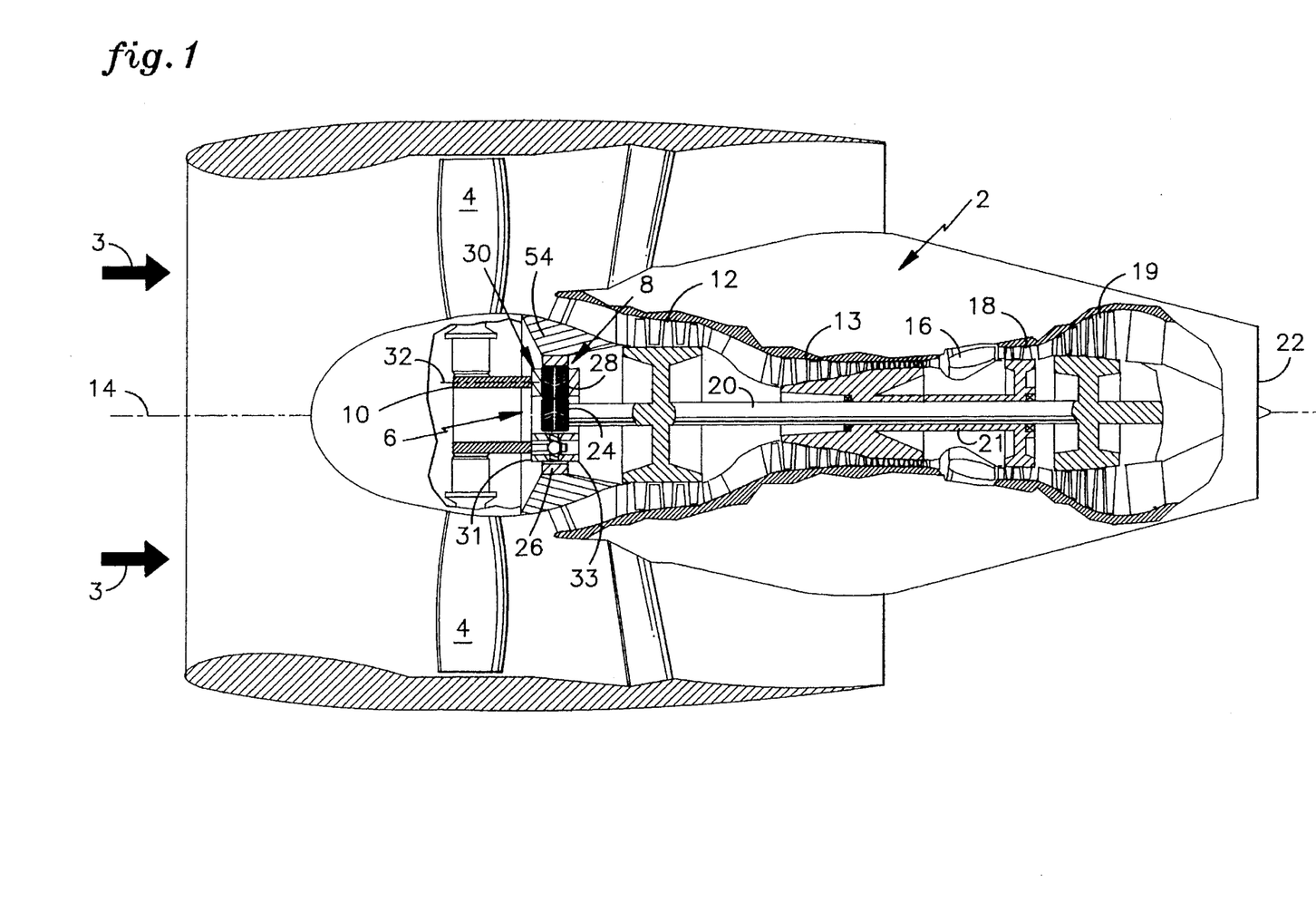
FIG. 1 is a schematic cross-sectional elevation of a high bypass aircraft engine employing the geared drive system of the present invention.

The best mode for carrying out the invention is set forth in the context of a high bypass gas turbine aircraft engine shown schematically in FIG. 1. The engine includes a powerplant 2, a bladed propulsor or fan 4, and a drive system 6 for conveying rotary motion from the powerplant to the fan. In this exemplary embodiment, the drive system is a geared drive system including a planetary gear train 8 and a torque transfer structure or torque frame 10.

The power plant includes axial flow compressors 12 and 13 rotating about a longitudinally extending central axis 14 to compress intake air 3 and deliver it to a combustor 16 to be mixed with fuel (not shown) and ignited. Axial flow turbine 18 extracts energy from the hot combustion gases and, by means of shaft 21 drives compressor 13. Similarly, turbine 19 drives compressor 12 by means of shaft 20. Fan 4 is also driven by turbine 19, however, a planetary gear train 8 and a torque frame 10 are located mechanically intermediate the shaft 20 and the fan 4. The fan imparts a modest acceleration to a large volume of air, thereby producing substantial forward thrust. Any energy not consumed in the turbine to drive the fan and compressor is converted to addition forward thrust in the exhaust nozzle 22.

Figures 2, 3:
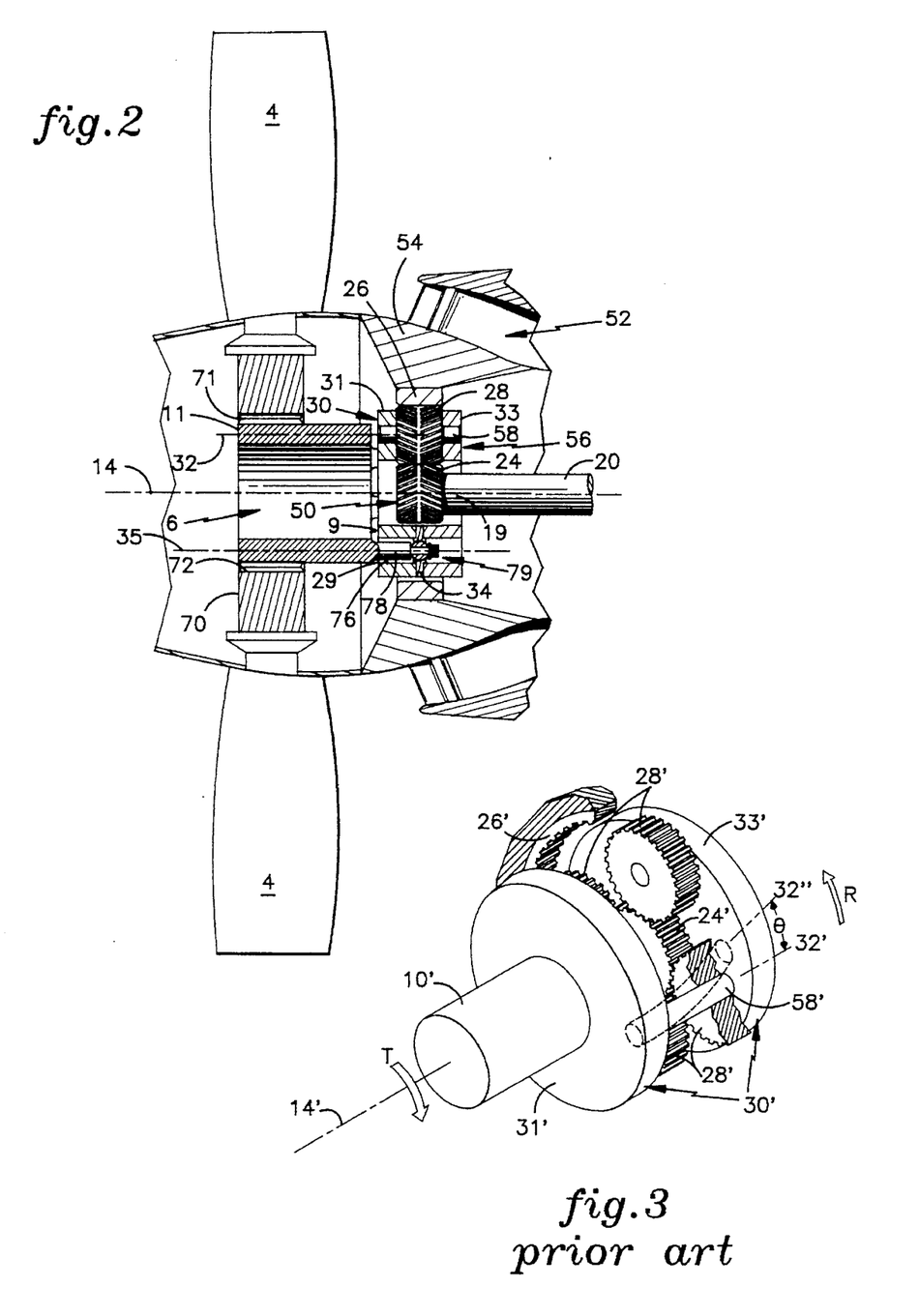
FIG. 2 is an enlarged cross-sectional elevation of the geared drive system employed in FIG. 1.
FIG. 3 is a simplified schematic perspective view of a prior art geared drive system with selected elements removed for clarity.

Referring to FIGS. 1 and 2, in the planetary gear train 8, a sun gear 24 is rotatably driven by the shaft 20. A ring gear 26 is fixed to the engine static structure and remains stationary relative to the rotating sun gear. A plurality of planet gears 28 is rotatably mounted in a planet carrier 30 so that each planet gear is in meshing engagement with the sun gear and ring gear. The sun gear, planet carrier and ring gear share the common central axis 14 while the planet gears have individual axes of rotation 32. In the illustrated embodiment, the sun gear and planet carrier are rotatable about the central axis while the ring gear is fixed relative thereto. Preferably, the gears are bihelical, as illustrated in FIGS. 1 and 2, ensure smooth meshing and quiet operation, however, the invention is independent of the type of gears used, and simple spur gears are depicted in the other Figures to ensure clarity of the disclosure.

The geared drive system of FIG. 1 is illustrated in more detail in FIG. 2. A sun gear assembly 50 includes the forward portion 19 of the shaft 20 and the sun gear 24. A stationary ring gear assembly 52 includes the ring gear 26 and a nonrotating support structure 54 which may be the engine case or a mounting arrangement connecting the ring gear to the engine case. A planet gear assembly 56 includes the plurality of planet gears 28, a carrier 30 having a forward end plate 31 and a rear end plate 33, and planet gear journals 58 mounted in the carrier for rotatably supporting the planet gears. The carrier 30 also includes a plurality of apertures, one of which is shown at 76, circumferentially intermediate the planet gears 28.

The sun gear assembly 50 is an input gear assembly since it is the component of the planetary gear train that receives rotary motion and torque from the powerplant 2 (FIG. 1). The planet gear assembly 56 is an output gear assembly since it is the component of the planetary gear train that transmits rotary motion and torque out of the planetary gear train to the fan.

The torque frame 10 completes the connection from the planet carrier 30 to the bladed propulsor represented by fan blades 4 mounted in the periphery of a disk 70 whose bore 72 is adapted, as by a spline 71, to mate with the torque frame and rotate therewith. The torque frame has a circumferentially discontinuous first end 9, terminating in a series of discrete and therefore independently flexible arms 78, and a second end 11 spaced axially from the first end. Each arm has a proximal end 29 integral with the torque frame and a distal end 34. Each arm projects through a corresponding aperture 76 in the forward end plate 31. At each of a plurality of locations circumferentially intermediate the planet gears, a joint 79 connects the carrier to the distal ends of the torque frame arms 78. At the distal end of each arm, the longitudinal centerline 35 of each arm is at a radius at least as great as that of the planet gear axes 32. Consequently, at least a portion of the distal end of each arm is at a radius greater than that of the planet gear axes. Near its second end, the torque frame 10 is connected to the rotating disk 70.

During operation, rotary motion of the fan blades 4 is resisted by forces generated when the fan blades interact with the ambient air. Because these resistive forces act at a finite distance from the central axis 14, their cumulative effect is to create a torque that must be overcome by the power plant. The joint configuration by which torque is communicated through the planet gear assembly to the torque frame is the central feature of the present invention and is best appreciated in contrast to the conventional arrangement depicted in FIG. 3.

FIG. 3 illustrates a geared drive system of conventional construction. As with the present invention, the geared drive system includes a ring gear 26', a sun gear 24', planet gears 28', a planet carrier 30' and a torque frame 10'. The planet carrier 30' has a forward end plate 31' and a rear end plate 33'. Each planet gear is rotatably supported in the carrier by a journal 58', and each journal has a central axis 32' which is the axis of rotation of the associated planet gear. For clarity, only one journal is shown and other structure connecting forward and rear end plates 31' and 33' has been omitted. Similarly, the fan blades are not shown; instead they are represented by the torque T that they impose on the drive system. The powerplant rotates the sun gear, planet carrier, and torque frame in direction R, opposite to the direction of the torque load T. Typical of the prior art, the torque frame is secured to the planet carrier so that the carrier experiences at least some of the torsional deflection occurring between the powerplant and the load. The torque frame is shown as a simple shaft secured to one end plate of the planet carrier. Many other constructions are possible including those in which the torque frame is integral with and indistinguishable from the carrier, however, they all share the characteristic that they transfer torsional deflection into the planet carrier. Consequently, the forward end plate 31' and rear end plate 33' of the planet carrier are circumferentially displaced relative to each other through an angle Θ. Each journal 58' is similarly deflected as shown in phantom so that the planet gear rotational axis 32' assumes a deflected orientation 32". Since the sun gear and ring gear axes remain parallel to the central axis 14' while the planet gear axes have become skewed or nonparallel relative thereto, the mesh between the planet gears and the sun gear, and the mesh between the planet gears and the ring gear deviate from the mesh that would have occurred had the axes remained parallel. If allowances are made in the gear tooth design to accommodate the effects of nonparallelism, they will only be completely effective at a single operating condition. Reinforcing the planetary gear train as by stiffening the carrier to minimize torsional deflection or by strengthening the gear teeth generally involves increased weight, cost, or physical size, all of which may be unacceptable.

Figure 4:
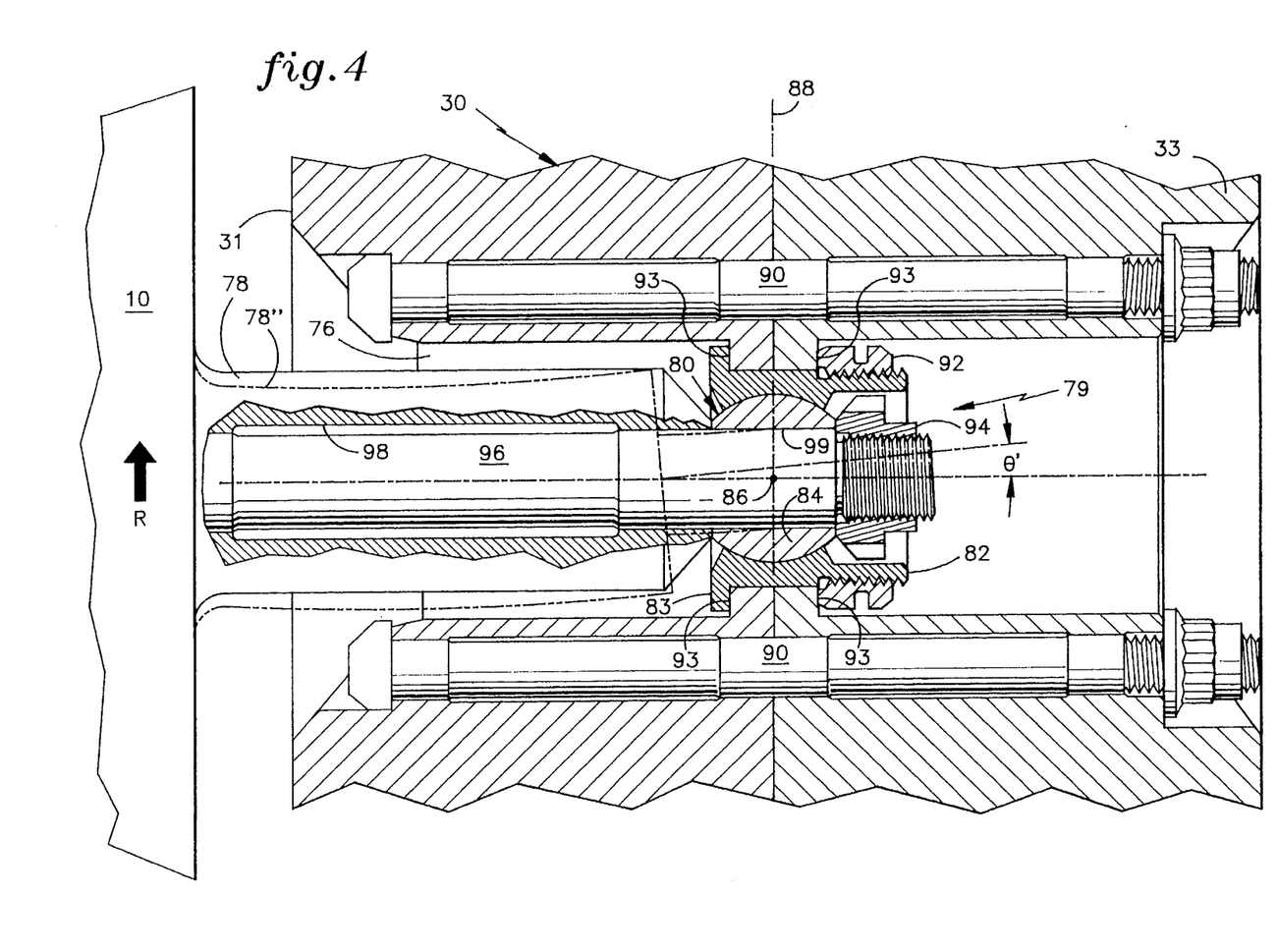
FIG. 4 is a fragmentary cross-sectional elevation of one embodiment of a joint employed in the geared drive system of the present invention.
Figure 6:
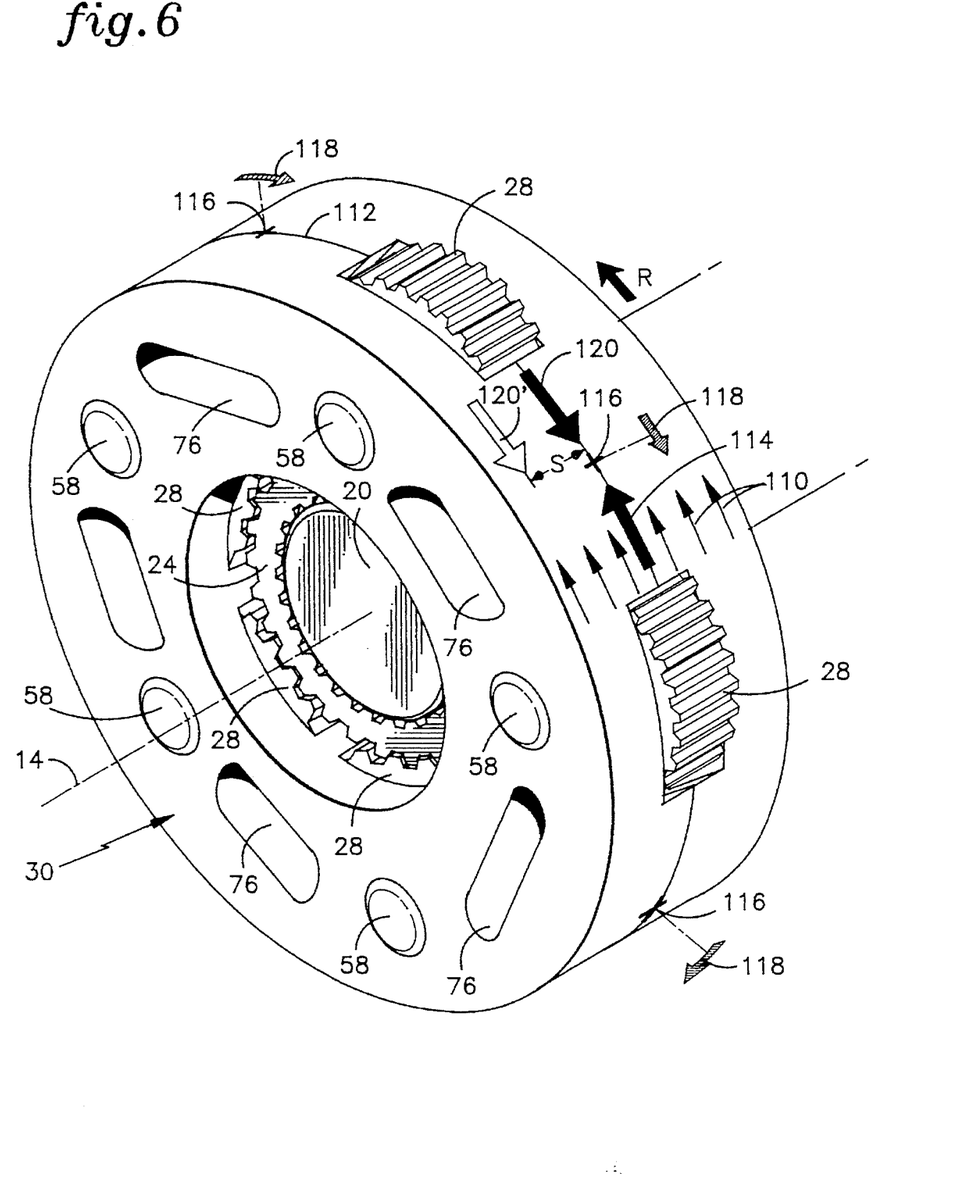
FIG. 6 is a simplified perspective view of a planet carrier of the geared drive system of the present invention showing various forces acting on the carrier.
Figure 7:
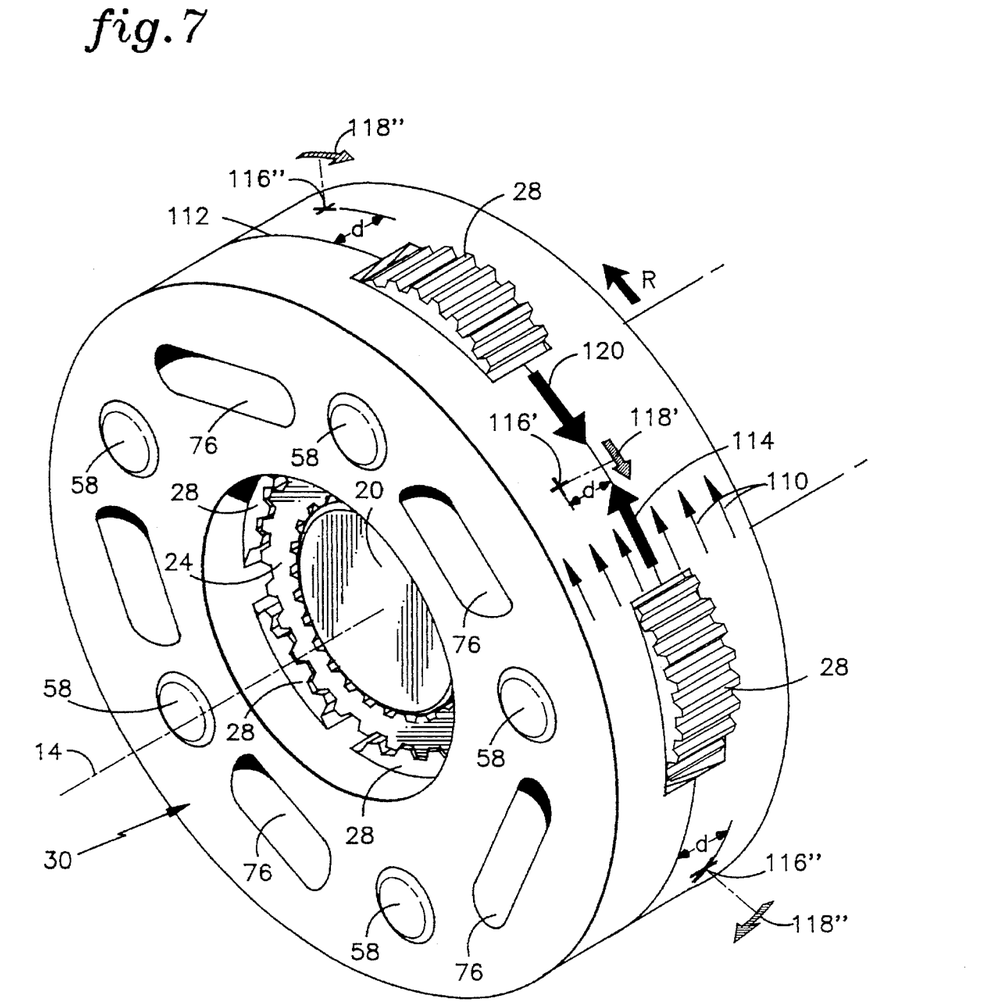
FIG. 7 is a view similar to FIG. 6 but showing a different force arrangement that preserves the benefits of the present invention.

The present invention isolates the planet carrier from the effects of torsional deflection by transferring torque from the carrier to the torque frame such that substantially all of the torsional deflection is experienced in the torque frame, and substantially none of the torsional deflection occurs in the planet carrier. One embodiment of the unique interface responsible for this isolation is illustrated in FIG. 4 which shows the forward end plate 31 and rear end plate 33 of the carrier 30 abuttingly mated together by carrier assembly bolts 90 (only two of which are shown). As best seen in FIGS. 6 and 7, the abutting contact extends over a substantial portion of the circumference of the carrier. The mating surfaces of the carrier end plates define shoulders 93, and the forward end plate 31 of the carrier includes a series of apertures 76 circumferentially intermediate the sun gears. At corresponding circumferential locations, the torque frame 10 is circumferentially discontinuous, terminating in a series of discrete arms 78. Each arm extends axially through the apertures to a location axially intermediate the forward end plate 31 and rear end plate 33 of the carrier where each arm is connected to the carrier by a joint 79 mechanically intermediate the torque frame and the carrier. Joint 79 is a spherical bearing 80 comprising a housing 82 with a flange 83 and a truncated spherical ball 84 trapped within the housing, but capable of pivotable motion about both a radial axis 86 perpendicular to the plane of the illustration and a tangential axis 88. A housing attachment nut 92 threads onto the end of the housing opposite the flange 83 to clamp the housing 82 onto the shoulder 93 to secure the spherical bearing to the carrier. An attachment bolt 96 extends through a substantially axial first hole 98 in each torque frame arm and a second hole 99 in the ball. The attachment bolts 96 and mating nuts 94 effect the connection of each torque frame arm 78 to the articulating balls 84 and hence to the carrier 30.

Under torsional load, the torsional deflection or twisting of the torque frame is manifested as bending of the torque frame arms 78 from their undeflected position through an angle Θ' to their deflected position 78" shown in phantom. The pivotability of the ball 84 about the radial axis 86 and the bending of the torque frame arms isolate the carrier 30 from torsional deflections.

Figure 5:
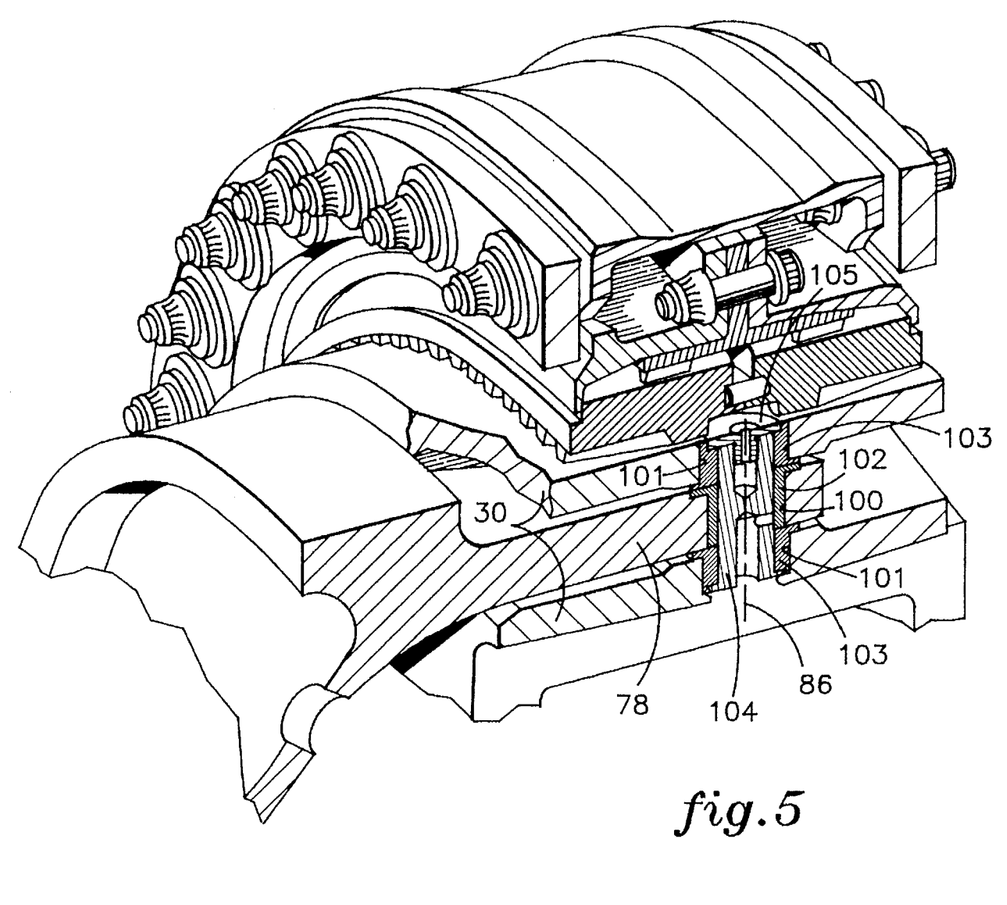
FIG. 5 is a partially sectioned perspective view of an alternative embodiment of a joint employed in the geared drive system of the present invention.

Alternative pivotable connections between the carrier and the torque frame are equally suitable. FIG. 5 shows one such connection where each torque frame arm 78 includes a radially extending hole 100 fitted with a pressed-in bushing 102. The carrier 30 includes corresponding holes 101, also fitted with bushings 103. A trunnion 104, radially disposed in the holes 101 in the carrier 30 and retained therein by a trunnion retention screw 105, extends through the hole 100 in the torque frame arms 78 to pivotably join the carrier and the torque frame. Under operational load, the torque frame arm 78 and the bushing 102 pivot about radial axis 86 while the trunnion remains stationary relative to the carrier. As in the case of the ball joint 80 of FIG. 4, the trunnion connection accommodates bending of the torque frame arms in the tangential direction without imposing any twist or torsional deflection on the carrier.

The axial positioning of the pivotable joint also contributes to the performance of the drive system of the present invention. FIG. 6 illustrates, in simplified form, a planet carrier 30 rotating in direction R about the central axis 14. A distributed driving force 110, symmetrical about the axial midpoint 112 of the planet gears 28, represents the force conveyed to the carrier by the planet gear orbital motion. The distributed driving force, which urges rotation of the carrier and, therefore, of the output gear assembly, can be represented by a resultant driving force 114 acting on the carrier at a location corresponding to the axial midpoint 112 of the planet gears. The carrier also experiences an individual reaction force 118 at each location 116 corresponding to the axial and circumferential position of each pivotable joint (not shown). The pivotable joints are axially positioned at locations 116 so that their individual reaction forces 118 all lie on a common plane perpendicular to the central axis 14 and located at the axial midpoint 112 of the planet gears. Consequently, the net resultant reaction force 120 corresponding to the individual reaction forces 118 also acts at the axial midpoint 112. The axial coincidence of the resultant reaction force 120 and the resultant driving force 114 at the axial midpoint 112 ensures that the carrier does not experience torsional deflection. If the axial coincidence were absent, for example, if the joints are placed so that their resultant reaction force 120' is axially separated by a distance S from the resultant driving force 114, the carrier will be subject to a twisting influence tending to diminish the benefits of the spherical bearing.

FIG. 7 illustrates staggering of the joint positions 116 forward and rearward of the midpoint 112. The distributed driving force 110, symmetrical about the axial midpoint 112 of the planet gears, urges rotation of the carrier and, therefore, of the output gear assembly. The distributed driving force can be represented by a resultant driving force 114 acting on the carrier at a location corresponding to the axial midpoint 112 of the planet gears. Circumferentially neighboring joints (not shown) are positioned at locations 116', forwardly offset from the midpoint 112 by a distance d and 116" rearwardly offset from the midpoint by an equal distance d. Because of the circumferentially alternating positioning of the joints at equal distances forward and rearward of the midpoint 112, the corresponding individual reaction forces 118' and 118" yield a resultant reaction force 120 acting at the midpoint 112 and axially coincident with the resultant driving force 114. The axial coincidence of the resultant reaction force 120 and the resultant driving force 114 at the axial midpoint 112 isolates the carrier from torsional deflection.

In the foregoing disclosure of the best mode for carrying out the invention, the sun gear assembly 50 (FIG. 2) is the input gear assembly, the planet gear assembly 56 is the output gear assembly, and the ring gear assembly is stationary. Those skilled in the art will appreciate that any one of these three gear assemblies can be the input, either of the remaining two gear assemblies can be the output and the remaining gear assembly can be stationary. For example, in one arrangement the planet carrier is stationary and the ring gear rotates. In this arrangement, the sun gear assembly is the input gear assembly, but the ring gear assembly, rather than the planet gear assembly, is the output gear assembly. This gear arrangement requires the ring gear support structure 54 to be rotatable about the central axis 14, and the planet carrier 30 to be stationary. In this arrangement, the torque frame connects the planet carrier, by way of pivotable joints as described hereinabove, to a stationary component, for example, the nonrotating support structure of a gas turbine engine, for reacting the torque being conveyed through the gear train. The distributed driving force 110 and its resultant 114 are still present but do not cause rotary motion of the carrier.

Geared drive systems can also be arranged so that one of the sun gear assembly, ring gear assembly, and planet gear assembly is an input gear assembly but that both of the remaining gear assemblies are output gear assemblies. This single input, dual output arrangement also benefits from the present invention provided the planet carrier is connected to the torque frame proximate its first end with pivotable joints as described hereinabove.

The best mode for carrying out the invention uses bihelical gears and a journal bearing arrangement to support the planet in the carrier. However, other gear types and bearing arrangements can be used without departing from the spirit and scope of the present invention.

Although this invention was described in the context of geared axial flow gas turbine engines, it is applicable to other machines that transmit torque through a planetary gear train.

The invention may be embodied in still other forms without departing from the spirit or essential character thereof. The embodiments of the invention discussed above are, therefore, illustrative and not restrictive, the scope of the invention being set forth by the appended claims rather than the foregoing description, and all changes which come within the meaning and range of equivalency of the claims are, therefore, intended to be embraced thereby.

Having thus described the invention, what is claimed is:

1. A geared drive system for a bladed propulsor, comprising:

a planetary gear train including a sun gear assembly comprising a sun gear, a ring gear assembly comprising a ring gear, a planet gear assembly comprising a plurality of planet gears mounted in a planet carrier and disposed mechanically intermediate of and in meshing engagement with the sun gear and the ring gear, the planet carrier having a forward end plate and a rear end plate abuttingly mated to each other, the abutting contact between the plates extending over a substantial portion of the circumference of the carrier, the forward end plate also having a plurality of apertures, wherein one of the sun gear assembly, ring gear assembly, and planet gear assembly is an input gear assembly receiving torque from a source thereof and at least one of the remaining of the sun gear assembly, ring gear assembly and planet gear assembly is an output gear assembly for delivering the torque to a load; and a torque transfer structure having a first end terminating in a series of discrete, independently flexible arms, each arm having a proximal end and a distal end, each arm projecting axially through a corresponding end plate aperture, the distal ends of the arms being joined to the planet gear assembly by a plurality of joints, at least a portion of the distal end of each arm being at a radius greater than that of the planet gear axes, each of said joints being, with respect to a load path through the gear train, mechanically intermediate the torque transfer structure and the planet gear assembly wherein each joint is pivotable about at least a radial axis.

2. The geared drive system of claim 1 wherein the pivotable joints are located with respect to the planet carrier such that a resultant driving force acting on the planet carrier and a resultant reaction force exerted by the pivotable joints on the carrier are axially coincident.

3. The geared drive system of claim 1 wherein the sun gear assembly is the input gear assembly, the plant gear assembly is the output gear assembly and the ring gear assembly is stationary with respect to the sun gear assembly and the planet gear assembly.

4. The geared drive system of claim 1 wherein the joints comprise spherical bearings.

5. The geared drive system of claim 4, wherein:

a first end of the torque transfer structure terminates in a plurality of arms each having a substantially axial first hole therethrough, and each spherical bearing comprises:

a housing secured to the planet carrier and stationary with respect thereto, a ball disposed within the housing and capable of pivotable motion with respect thereto about at least the radial axis, each ball also being connected to a corresponding one of the plurality of arms.

6. The geared drive system of claim 1 wherein:

the first end of the torque transfer structure terminates in a plurality of arms each having a radially extending hole therethrough, the carrier includes a plurality of corresponding radially extending holes, and a trunnion is radially disposed through each radially extending hole and through each corresponding hole to pivotably join the torque frame to the carrier.

7. The geared drive system of claim 1 wherein the sun gear, the ring gear, and the plurality of planet gears are bihelical.

8. A geared drive system for a bladed propulsor, comprising:

a planetary gear train including:

a sun gear assembly comprising a sun gear driven by a source of input torque, a ring gear assembly comprising a ring gear stationary with respect to the sun gear assembly, a planet gear assembly including a plurality of planet gears supported in a planet carrier by journals and disposed mechanically intermediate of and in meshing engagement with the sun gear and the ring gear whereby the planet carrier is urged to rotate by a resultant driving force, the planet carrier having a forward end plate and a rear end plate abuttingly mated to each other, the abutting contact between the plates extending over a substantial portion of the circumference of the carrier, ,the forward end plate also having a plurality of apertures;

a torque transfer structure for driving a load, the torque transfer structure being rotatable about a central axis and having a first end terminating in a series of discrete, independently flexible arms, each arm having a proximal end and a distal end, each arm projecting axially through a corresponding end plate aperture, at least a portion of the distal end of each arm being at a radius greater than that of the planet gear axes, the torque transfer structure also having a second end connected to a rotating component; and a plurality of joints circumferentially disposed with respect to the carrier, each of said joints being, with respect to a load path through the gear train, mechanically intermediate the torque transfer structure and the planet gear assembly and each joint being pivotable about at least a radial axis for joining the planet carrier to the distal ends of the arms, each joint exerting a resultant reaction force on the carrier and wherein the joints are axially positioned with respect to the carrier such that the resultant reaction force is axially coincident with the resultant driving force at the axial midpoint of the planet gears for transmitting the resultant driving force from the carrier to the arms without imposing torsional deflection on the carrier.

9. A geared drive system for a bladed propulsor, comprising:

a planetary gear train including:

a sun gear assembly comprising a sun gear driven by a source of input torque, a ring gear assembly comprising a ring gear stationary with respect to the sun gear assembly, a planet gear assembly comprising a plurality of planet gears supported in a planet carrier by journals and disposed mechanically intermediate of and in meshing engagement with the sun gear and the ring gear whereby the planet carrier is urged to rotate by a resultant driving force, the planet carrier having a forward end plate and a rear end plate abuttingly mated to each other, the abutting contact between the plates extending over a substantial portion of the circumference of the carrier, the forward end plate also having a plurality of apemares;

a torque transfer structure for driving a load, the torque transfer structure being rotatable about a central axis and having a first end terminating in a series of discrete, independently flexible arms, each arm having a proximal end and a distal end, each arm projecting axially through a corresponding end plate aperture, at least a portion of the distal end of each arm being at a radius greater than that of the planet gear axes, the torque transfer structure also having a second end connected to a rotating component; and a plurality of joints circumferentially disposed with respect to the carrier, each of said joints being, with respect to a load path through the gear train, mechanically intermediate the torque transfer structure and the planet gear assembly and each joint being pivotable about at least a radial axis for joining the planet carrier to the distal ends of the arms, each joint exerting a resultant reaction force on the carrier and wherein the joints are axially positioned with respect to the carrier on a common plane perpendicular to the central axis and at the axial midpoint of the planet gears for transmitting the resultant driving force from the carrier to the arms without imposing torsional deflection on the carrier.

10. A geared drive system as in claim 8 wherein the sun gear assembly is an input gear assembly for receiving torque from a source thereof the ring gear assembly is an output gear assembly for delivering torque to a load, the planet carrier is stationary, and the second end of the torque transfer structure is connected to a nonrotating structure.

11. A geared drive system as in claim 9 wherein the sun gear assembly is an input gear assembly for receiving torque from a source thereof the ring gear assembly is an output gear assembly for delivering torque to a load, the planet carrier is stationary, and the second end of the torque transfer structure is connected to a nonrotating structure.

* * * * *

UNITED STATES PATENT AND TRADEMARK OFFICE
CERTIFICATE OF CORRECTION

PATENT NO. : 5,466,198

DATED : November 14, 1995

INVENTOR(S) : Albert H. McKibbin and Jon D. Burns

It is certified that error appears in the above-identified patent and that said Letters Patent is hereby corrected as shown below:

Col. 10, line 29, delete "apemares" and substitute --apertures--.

Signed and Sealed this

Second Day of April, 1996

Attest:

BRUCE LEHMAN

Attesting Officer

Commissioner of Patents and Trademarks